INVENTOR.
William G. Bley,
BY Paul & Paul
ATTORNEYS

INVENTOR.
William G. Bley,
BY Paul & Paul
ATTORNEYS

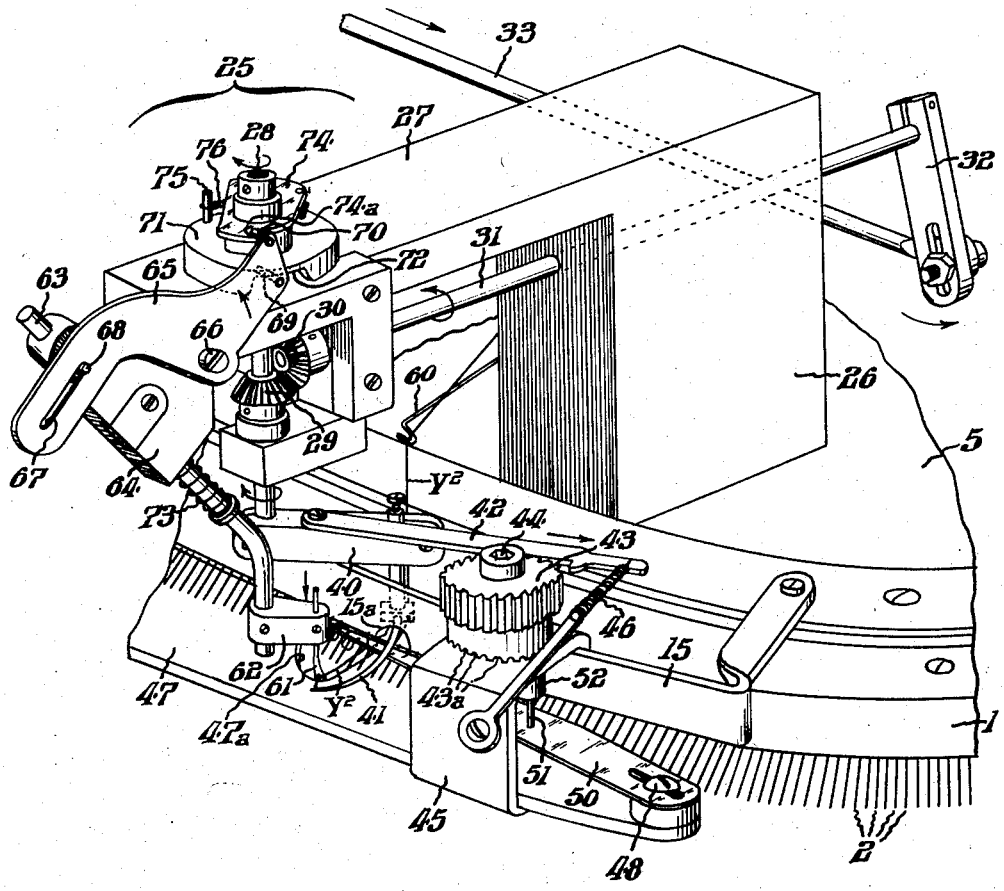

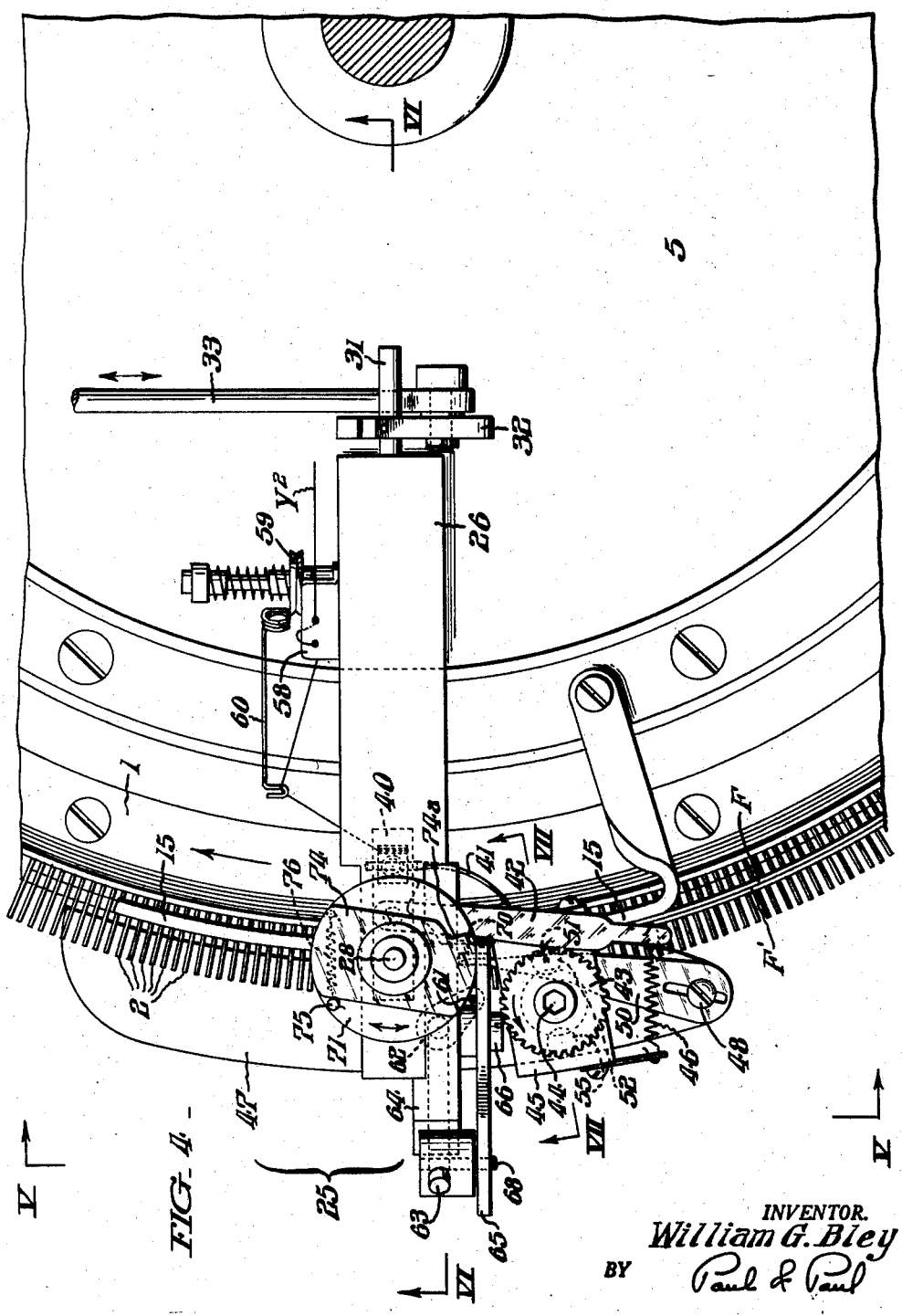

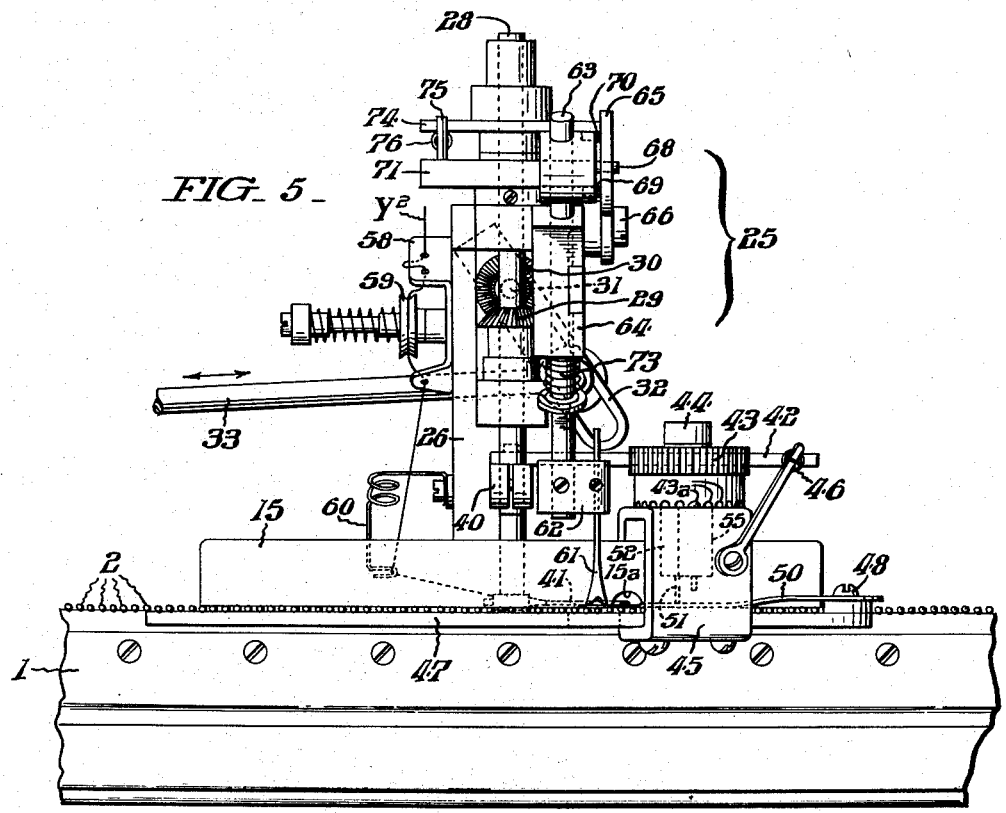
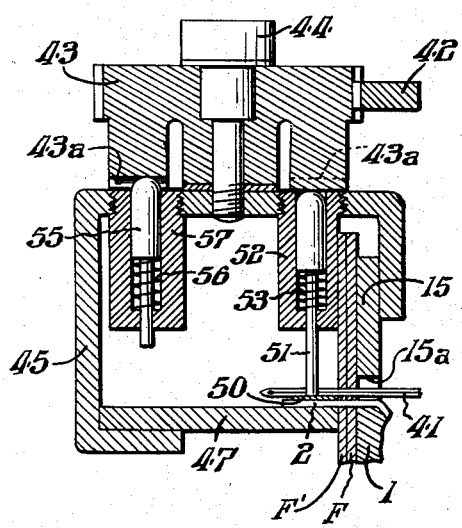
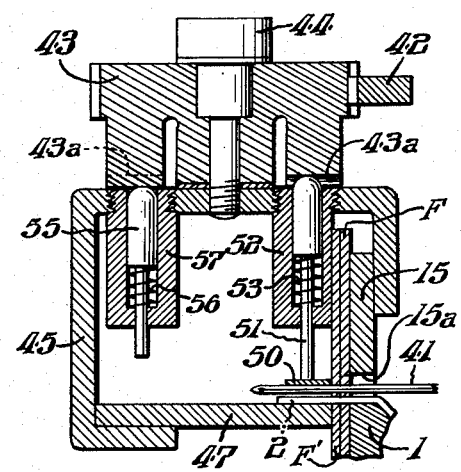

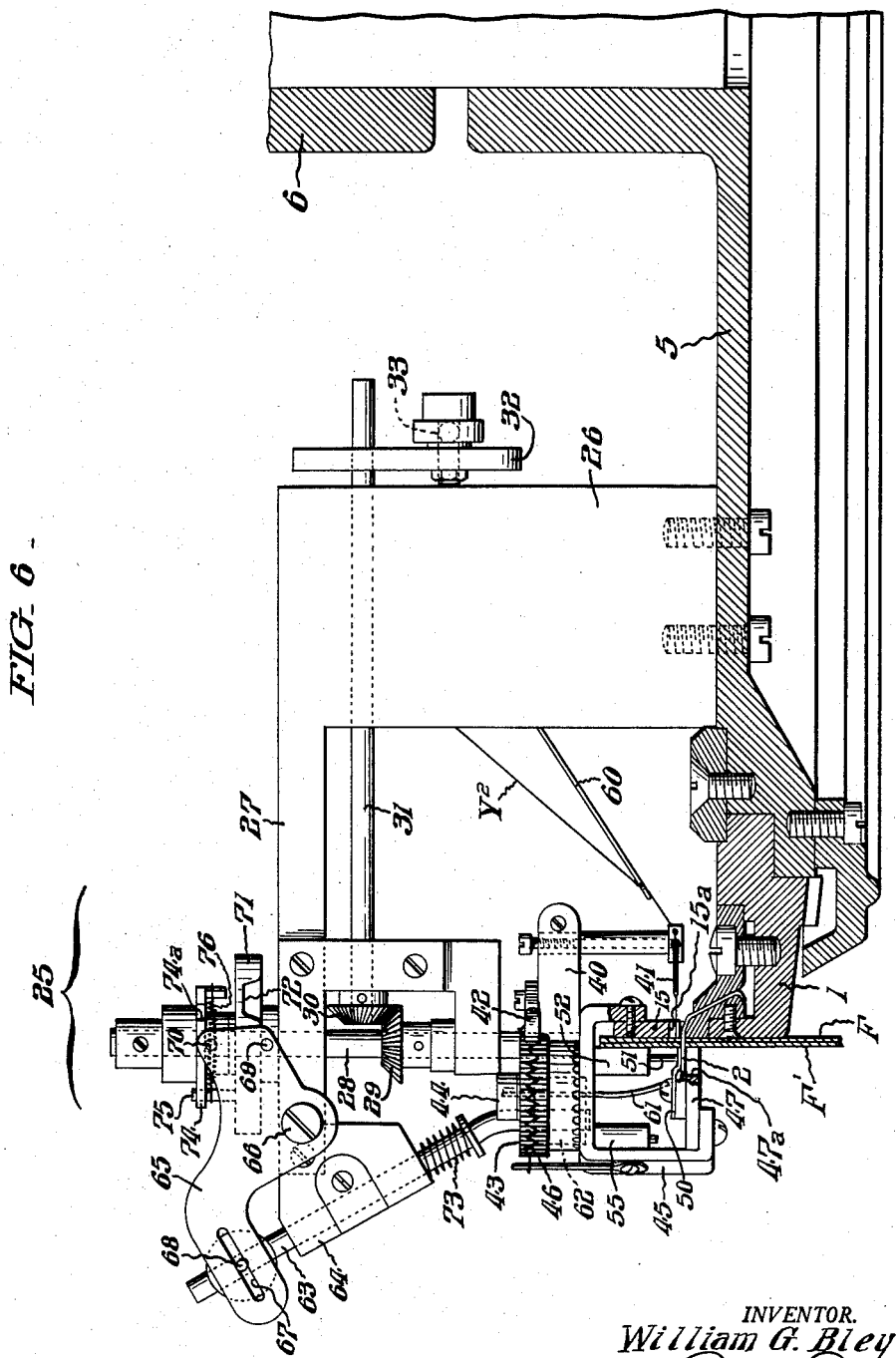

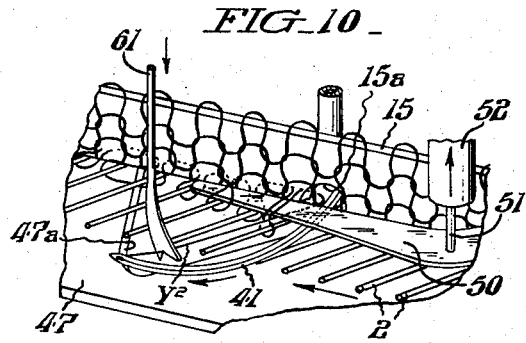
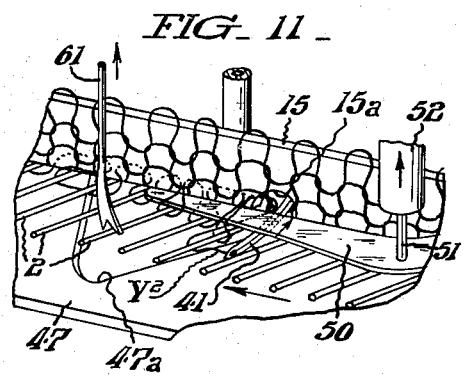
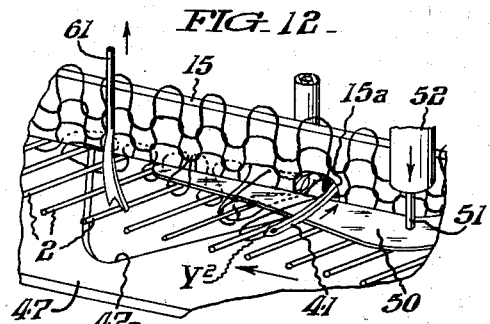
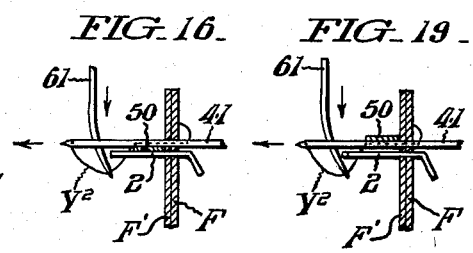
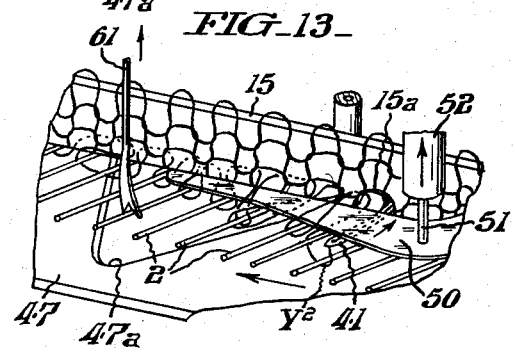
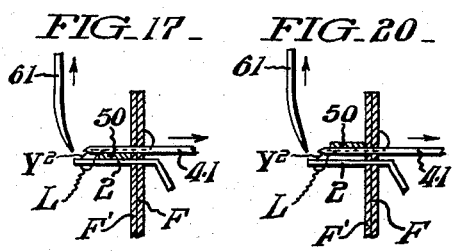
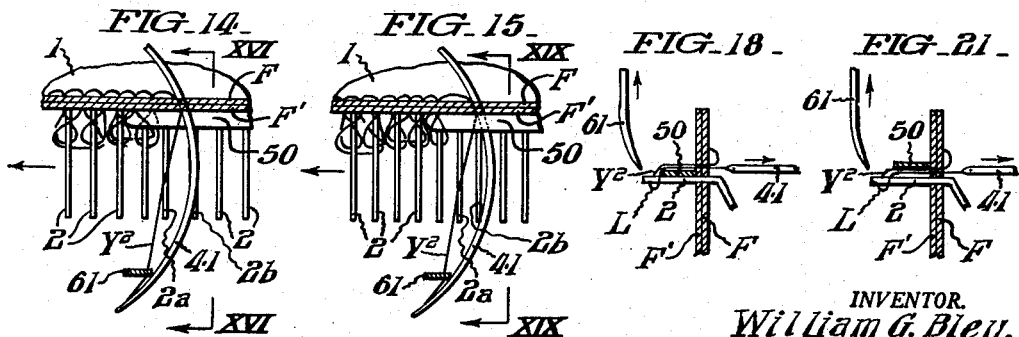

2,871,806

LOOPING MACHINES AND METHODS, AND IN KNITTED FABRICS SEAMED THEREBY

William G. Bley, Richboro, Pa., assignor, by direct and mesne assignments, to Scott & Williams, Incorporated, Laconia, N. H., a corporation of Massachusetts Application February 15, 1957, Serial No. 640,462

35 Claims. (Cl. 112—25)

This invention relates to looping machines and methods, and to knitted fabrics seamed thereby. My invention may be applied to advantage with looping machines, such as are ordinarily used, for example, in closing the toes of seamless stockings, and in part with looping methods and with looped seams. More particularly, it is well adapted for use with looping machines of the type having a rotary dial with radially-projecting points onto which raw-edged marginal portions of the toe opening of a stocking are doubled and impaled for presentation to a thread-carrying needle and a cooperative thread-carrying looper by which the seaming is effected. Heretofore, in order to insure the formation of a perfect seam which could be relied upon for assurance against subsequent development of runs in the stocking fabric, it was necessary that the loops in the half portions of the toe opening along a definite course adjacent the edge of such opening, be impaled individually upon successive points of the machine dial. This operation was extremely tedious and time consuming, and entailed employment of highly skilled help at high pay which help, in order to become efficient, had to be trained over long periods at considerable expense, thereby adding greatly to the costs of stocking manufacture.

The chief aim of my invention is to overcome the above drawbacks, i. e. to make it possible to dispense with the necessity for the employment of specially skilled help to operate looping machines of the kind referred to. This objective is realized in practice, as hereinafter more fully disclosed, through the provision in such machines, of auxiliary mechanism including an auxiliary needle and associated cooperative elements by which multiple loops are formed by my new method from an auxiliary yarn on individual dial points of the machine through doubled half-edge portions of the toe openings of the stocking run onto said points without strict regard as to penetration of individual fabric loops along any definite course, the doubled fabric portions and the loops of the auxiliary yarn being later penetrated by loops formed by the usual needle from the usual needle yarn, and the loops of said usual needle yarn united by concatenating loops formed by the usual looper from the looper yarn, with resultant production of a novel seam by which the two fabric portions are united against subsequent raveling.

Other objects and attendant advantages will appear from the following detailed description of the attached drawings, wherein:

Fig. 3 is a view similar to Fig. 2 with the auxiliary loop forming elements differently positioned.

Fig. 4 is a fragmentary view in horizontal section looking down upon the point dial.

Fig. 5 is a fragmentary view in elevation looking as indicated by the angled arrows V—V in Fig. 4.

Fig. 6 is a fragmentary view in vertical section taken as indicated by the angled arrows VI—VI in Fig. 4.

Fig. 7 is a detail sectional view taken as indicated by the angled arrows VII—VII in Fig. 4.

Fig. 8 is a view similar to Fig. 7 with the moving parts differently positioned.

Figs. 10, 11, 12 and 13 are fragmentary perspective views, showing how loops of the auxiliary yarn are formed, according to my invention, through the doubled marginal portions of the toe opening in the stocking impaled on the dial points of the machine and engaged downwardly about said dial points prior to presentation to the usual yarn-carrying needle and cooperative yarn-carrying looper of the machine.

Figs. 14 and 15 are fragmentary detail views in top plan corresponding to Figs. 12 and 10 respectively, showing how different loops are formed from the auxiliary yarn.

Fig. 16 is a detail sectional view taken as indicated by the angled arrows XVI—XVI in Fig. 14.

Figs. 17 and 18 are views similar to Fig. 16 showing subsequent steps in the formation of loops of the auxiliary yarn through the superposed fabric edges and about the dial points under the conditions shown in Fig. 14.

Fig. 19 is a detail sectional view taken as indicated by the angled arrows XIX—XIX in Fig. 15.

Figure 9:
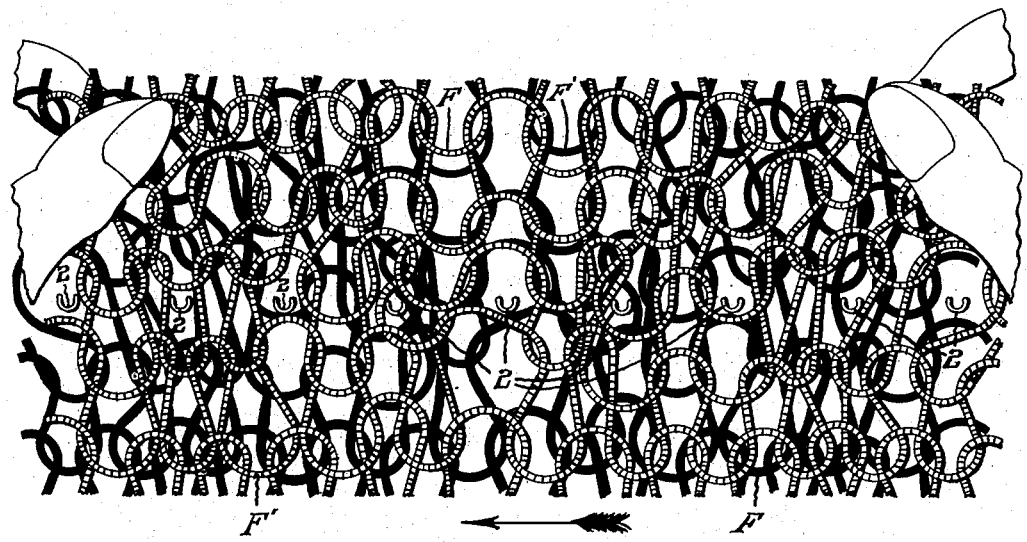
Fig. 9 is a fragmentary view showing how the half edge portions of the toe opening of a seamless stocking are impaled upon the dial points of the looping machine in accordance with my new method, the loops of the seaming yarns being exaggerated in size for the sake of clarity.
Figure 22:
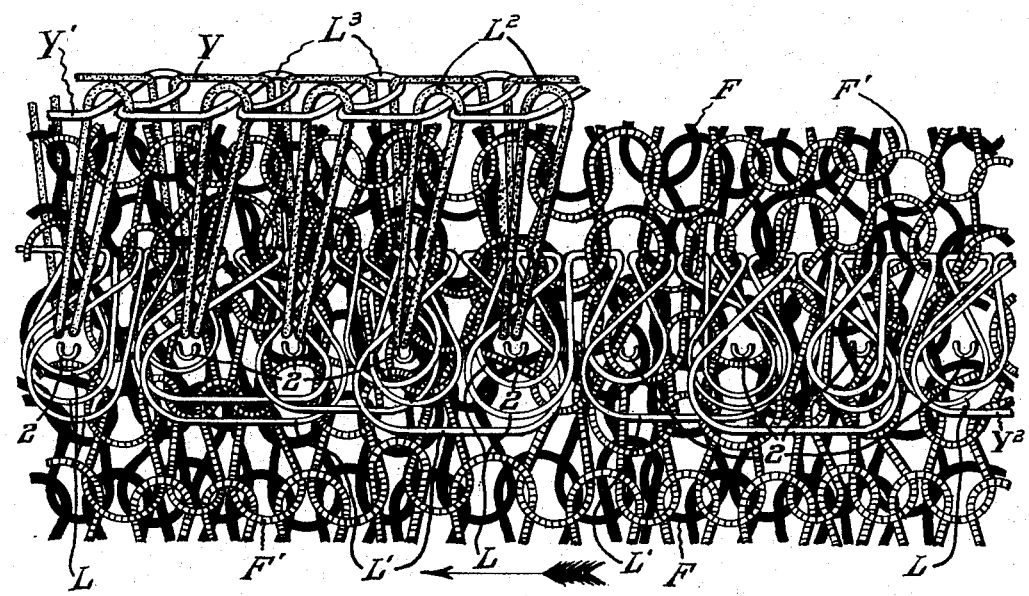

Figs. 20 and 21 show successive steps in the formation of loops from the auxiliary yarn under the conditions shown in Fig. 15; and Fig. 22 is a view similar to Fig. 9 showing how the doubled edge portions of the fabric are eventually united by interloopment of the usual needle and looper yarns in accordance with my invention.

The looping machine herein illustrated for convenience of exemplifying my invention, is of a well known commercial type having a grooved rotary ring dial 1 with spaced points 2 projecting radially beyond its periphery. The dial 1 is supported for continuous rotation in the direction of the arrows in Figs. 1–4, for successive presentation of the points 2 to the usual seaming needle and usual cooperative looper respectively indicated at 3 and 4, in a circular bed plate 5 suspended from the distal end of an overhanging bracket arm 6 whereof the base 7 is adapted to be bolted or otherwise secured to the top of a work bench or stand. Journalled in spaced upstanding bearings 8 and 9 on the bracket base 7 is the usual horizontal shaft 10 whereto are secured at one end, a drive pulley 11 and a hand wheel 12. Through the medium of suitable instrumentalities which need not be particularly described herein, the needle 3 and the looper 4 are actuated in proper timed relation to form from yarns Y and Y' drawn from suitable supply sources (not shown), through disk tensions 13 and 14 respectively, a chain of concatenated loops in the well known way. It is to be understood that, during each rotation of the shaft 10, the needle 3 and looper 4 are actuated but once, and that the dial 1 is turned by a distance equal to the spacing of the points 2. The machine is further provided, as usual, with a fabric guard 15, and with a trimming knife 16 which latter is carried by a lever 17 fulcrumed on a fixed bracket 18 at the edge of the bed plate 5. The lever 17 is oscillated, through a link rod 19, from a crank disk 20 on the end of the shaft 10 opposite to that occupied by the pulley 11 and the hand wheel 12.

The auxiliary mechanism which I have devised for incorporation in such a machine to carry out my improved method of looping, is comprehensively designated 25, in Figs. 1–6 the same being stationed just ahead of the trimming knife 16 as considered with respect to the direction of rotation of the dial 1. The mechanism 25 comprises a bracket 26 which is secured to the bed 5 of the machine and which has an arm 27 extending outwardly over the dial 1 and its points 2. The distal end of the bracket arm 27 is shaped in the form of a jaw whereof the upper and lower portions are bored for the passage of a vertical shaft 28. Fixed on the shaft 28 within the hollow of the bracket jaw is a miter pinion 29 that meshes with a miter pinion 30 at the outer end of a horizontal shaft 31 borne in the columnar portion of the bracket 26. Fast on the inner protruding end of the shaft 31 is an arm 32 which, by means of a link rod 33, is connected to a crank arm 34 (Fig. 1) affixed to a short shaft 35 together with a spur pinion 36, said shaft 35 being supported in a bearing piece 38 secured to the outer side of the post 8 on the base 7 of the bracket 6. As shown, the pinion 36 meshes with a larger spur wheel 39 fast upon the drive shaft 10 of the machine inward of the crank disk 20. To the bottom end of the shaft 28 (Figs. 2–5) is clamped an arm 40 which carries an auxiliary arcuate needle 41 for oscillation in a horizontal plane through a clearance notch 15a in the bottom edge of the guard 15. Pivoted on the arm 40 is a pawl 42 for picking a ratchet wheel 43 rotative about a stud 44 at the top of an open bracket 45 affixed to the guard 15 in advance of the bracket 26 with respect to the direction of rotation of the dial 1. The spring indicated at 46 serves to maintain the pawl 42 in operative engagement with the ratchet wheel 43. In turn affixed to the bottom of the bracket 45 so as to underreach the dial points 2 is a segmental plate 47 whereto is adjustably secured at 48, a spring tongue 50 which overlies the points 2 of the dial 1 and extends in close proximity to the periphery of the dial 1 and terminates somewhat beyond the location at which the needle 41 operates. The hub of the ratchet wheel 43 is provided at the bottom with a series of radial teeth 43a of which the number is half that of the ratchet teeth. As the wheel 43 is picked, the teeth 43a act upon the rounded top end of a plunger 51 which is guided for up and down movement in a boss 52 pendent from the upper portion of the bracket 45. The plunger 51 is yieldingly urged upwardly by a spring 53, the diametrically-reduced lower end of said plunger being always in contact with the top of the tongue 50 at a point medially of the ends of the latter as best seen in Figs. 2, 3 and 5–8. A similar plunger 55 is pressed upwardly by a spring 56 within another boss 57 pendent from the upper portion of the bracket 45 substantially diametrically opposite the boss 52. The arrangement is such that when the plunger 51 bears upon a tooth 43a, the plunger 55 engages within the space between a pair of such teeth as in Fig. 7 to prevent overthrow of the ratchet wheel. In a like manner, the plunger 51 acts to prevent overthrow of the ratchet wheel 43 when the plunger 55 is engaged on a tooth 43a as shown in Fig. 8. From Figs. 4 and 5 it will be noted that, the auxiliary yarn designated Y² is directed through three eyes of a guide 58 at one side of the bracket 26, and between a pair of fixedly supported tension disks 59 and finally through the eye of a spring take-up finger 60 enroute to the needle 41.

Figure 2:
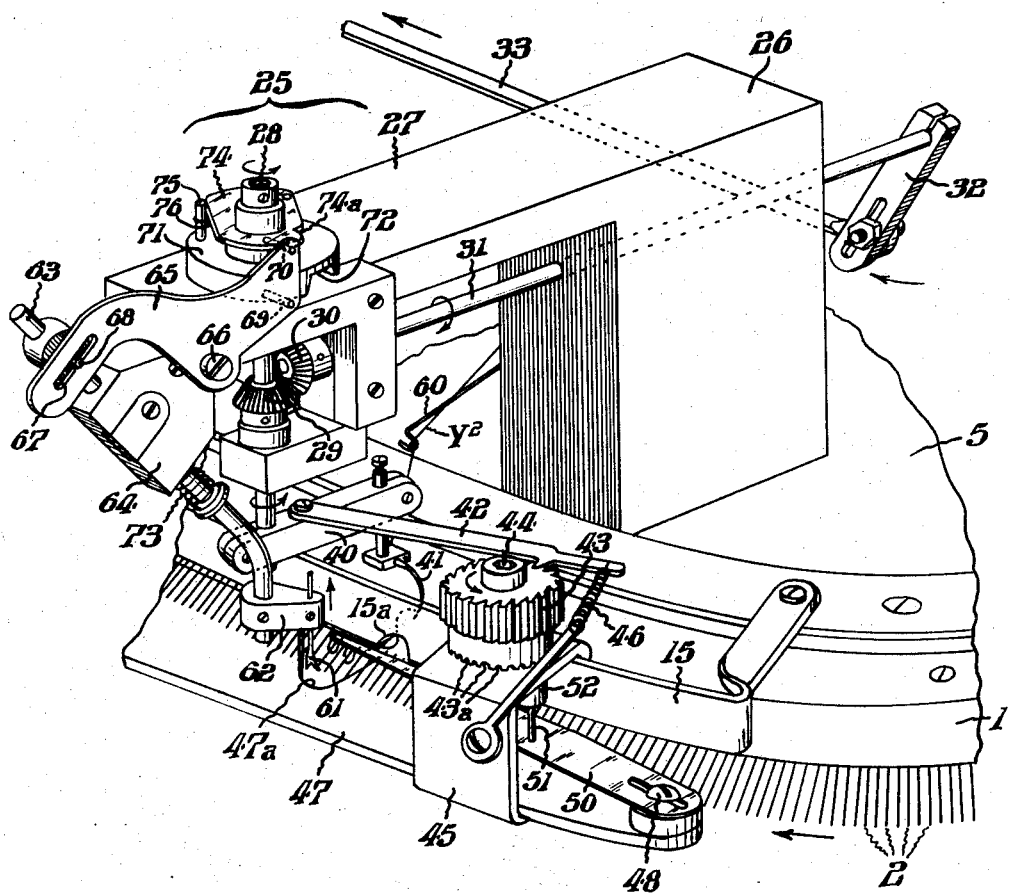
Fig. 2 is a fragmentary view corresponding to Fig. 1 and drawn to a larger scale showing more particularly the auxiliary mechanism.

For cooperation with the needle 41 to form loops of the auxiliary yarn Y² about the dial points as later on explained, I have provided a depresser 61 of which the end is V notched as best seen in Figs. 2 and 5. As shown, the depresser 61 is fast in a collar 62 affixed to the bottom end of a bent rod 63 which is slidably engaged in a head 64 on the end of the upper portion 27 of the bracket 26, the plate 47 being cut away as at 47a to clear said depresser. A bell crank lever 65 fulcrumed at 66 on the head 64 is slotted at one extremity as at 67 for engagement by a cross pin 68 adjacent the upper end of the rod 63, and provided at the other extremity with a pair of laterally projecting pins 69 and 70. Fast upon the upper end of the shaft 28 is a cam 71 which has a notch 72 at the bottom. As the notch 72 of the disk 71 overpasses the pin 69 on the bell crank lever 65, the rod 63 is urged downward by the spring shown at 73 to lower the depresser 61. During a portion of each oscillation of the shaft 28, the pin 70 on the bell crank lever 65 rides on the top of an irregularly-shaped delay action cam disk 74 which is notched as at 74a and free on said shaft above the cam 71, said disk being normally held yieldingly in the position of Figs. 2 and 4, with the straight side edge thereof engaging an upstanding stop 75 on said cam, by a spring 76. It is to be particularly noted, that due to the ratio of the gears 38 and 39, the auxiliary needle 41 and the depressing element 61 are actuated several times for each actuation of the usual seaming needle 3 and looper 4.

For convenience of more ready distinction in Figs. 9 and 22, the yarn in the portion F of the fabric is shown in solid black, the yarn in the portion F' of the fabric is line shaded, the auxiliary yarn Y² is shown white, the yarn Y is stippled, and the yarn Y' is shown plain.

*Operation*

Figure 1:
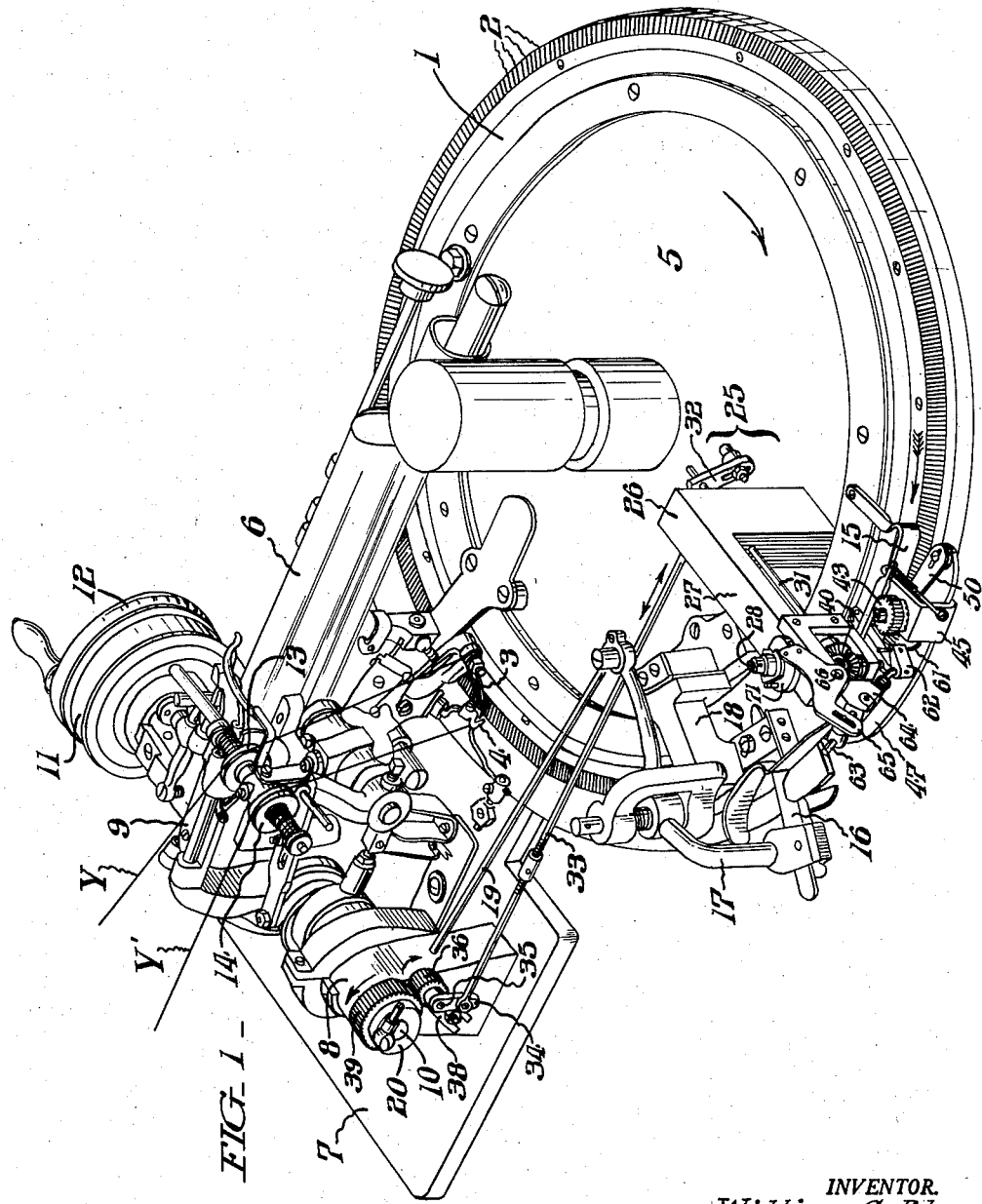
Fig. 1 is a perspective view of a looping machine conveniently embodying my invention and suitable for the practice of my improved method of looping.

As the dial 1 is continually rotated in the direction of the arrows in Figs. 1 and 4, first one half portion F and then the other half portion F' of the edge margin around the toe opening of the stocking are impaled upon the points 2 as shown in Fig. 9 ahead of the mechanism 25. According to my improved method, this impalement may be effected without regard to exact serial fabric loop penetration along any definite course of the fabric. By continued rotation of the dial 1, the upstanding doubled marginal portions F, F' of the fabric thus impaled on the points 2, pass behind the guard 15 by which they are constrained for penetration by the auxiliary needle 41. As the ratchet wheel 43 is picked by the pawl 42, the plunger 51 is actuated to depress the tongue 50 so that, at one actuation, the auxiliary needle 41 overpasses the tongue as in Figs. 12, 14 and 16–18, and upon the next actuation, said needle underpasses said tongue as in Figs. 10, 11, 13, 15 and 19–21. By incidental oscillations of the shaft 28 through its connections 29, 30, 31, 32, 33, 35, 36, with the drive shaft 10 of the machine, the depresser 61 is lowered each time that the auxiliary needle 41 is advanced to depress the chord of said yarn extending across the arc of said needle to a level below the points 2 as shown in Figs. 10, 16 and 19. Upon each retraction of the needle 41 as in Figs. 11, 13, 17, 18, 20 and 21, a loop of the auxiliary yarn Y² is formed through the doubled margins F, F' of the fabric and engaged downwardly about one or two of the dial points 2. By repetitions of this action, alternate loops of the auxiliary yarn Y² are formed over and under the tongue 50 from the distal end of which said loops slip eventually upon further rotative advance of the dial 1, and are tightened by the action of the spring take-up finger 60, said tongue thus functioning as a stitch finger to determine loop size. Due to the fact that the auxiliary needle 41 is repeatedly oscillated during the time that the dial 1 moves through a distance equal to the point spacing a corresponding number of loops of the auxiliary yarn Y² are formed through the doubled fabric portions F, F'. At least one such loop L (Fig. 22) is engaged about each dial point while others, such as the loops L', are engaged about two adjacent dial points, the total loops of the auxiliary yarn along a length of the looping line being always in excess of the number of fabric course loops in a corresponding length of the fabric along such line. The reason for this disposal of the loops of the auxiliary yarn Y² will be readily understood by reference to Figs. 14, 15, 17 and 18.

With a pair of adjacent points 2a and 2b positioned relative to the needle 41 as in Fig. 14, the yarn Y² will be depressed each time that the needle is advanced, and a loop 1 formed about the point 2a upon retraction of the needle as in Figs. 17 and 18. Several loops L will thus be formed about the point 2a until it and the point 2b reach the position of Fig. 15 relative to the needle 41, when a loop L' of the yarn Y² will be formed about both said points. When the point 2b arrives at the position occupied by the point 2a in Fig. 14, several loops L will be formed about it from the auxiliary yarn Y² in the same way as above described in connection with said point 2a. This cycle is repeated with more or less regularity as the operation proceeds. Finally, as the doubled fabric portions pass the usual needle 3 and looper 4, loops L² will be formed from the yarn Y through said portions and through the loops L and L' of the yarn Y², and said loops L² locked by enchainment with loops L³ of the yarn Y' as shown at the left of Fig. 22, to complete the seam of the fabric.

For the purposes of my invention, the auxiliary yarn Y² may be of a very fine denier. The seam produced is thus not at all objectionable from the standpoint of bulk and is therefore comparable in appearance and stretchability with seams heretofore made by the specially skilled looping machine operators, with the interlocked loops of the usual needle and looper yarns Y, Y' extending over and binding together the fabric edge portions in mutual abutment.

From the foregoing it will be evident that a looping machine equipped with auxiliary mechanism such as herein disclosed can be operated by anyone without any special skill or pre-training as was essential in the past. A great saving in production costs in the manufacture of stockings and the like is thus made possible.

My invention is not to be considered as restricted solely to the closing of the toe openings of seamless stockings since, with it, it is equally possible to seam together the edges of two or more separate pieces of knitted fabric even along diagonal lines with assurance against the development of subsequent runs in such fabrics. Furthermore, although I have described my invention as applied to a well known commercial type of looping machine, it will be apparent to those skilled in the art that the invention has many different applications and that the looping machine and method herein described may otherwise be varied to a considerable extent without departing from the spirit of the invention.

Having thus described my invention, I claim:

1. A looping machine comprising elements for reception of loops of superposed layers of knitted fabric along a looping line, means for projecting loops of thread through loops of the knitted fabric and for engaging the projected loops about said elements, and means for sewing said layers together, the last means passing stitch loops through said layers and through the projected loops engaged about said elements.

2. A looping machine according to claim 1 in which the first mentioned means projects loops along a length of said looping line in excess of the number of said elements located along the same length, with at least some of said elements engaging a plurality of said projected loops.

3. A looping machine according to claim 2 in which at least some of the first mentioned projected loops are penetrated by a plurality of said stitch loops.

4. A looping machine according to claim 1 in which the first mentioned means projects through said layers along a length of said looping line a number of loops substantially in excess of the number of wales of one of said layers along the same length.

5. A looping machine according to claim 4 in which the first mentioned means projects loops along a length of said looping line in excess of the number of said elements located along the same length, with at least some of said elements engaging a plurality of said projected loops.

6. A looping machine according to claim 5 in which at least some of the first mentioned projected loops are penetrated by a plurality of said stitch loops.

7. A looping machine according to claim 1 comprising means for controlling the lengths of the first mentioned projected loops.

8. A looping machine according to claim 7 in which the last mentioned means comprises a blade about which the first mentioned projected loops are projected for engagement on said elements.

9. In a looping machine having a moving element with a series of projecting points, and means to which the points are successively presented for the formation of a chain of concatenated loops from two different yarns; the combination of auxiliary mechanism positioned in advance of said means with respect to the direction of movement of said element including instrumentalities for forming loops of an auxiliary yarn through superposed edge portions of knitted fabric previously impaled on the points and causing such loops to be engaged about individual points of incorporation subsequently with concatenated loops of the aforesaid chain into a seam to unite the superposed fabric edges.

10. In a looping machine having a rotary dial, with points projecting radially from its periphery, a yarn-carrying needle and a cooperative looper to which the points are successively presented for the formation of a chain of concatenated loops from such yarns: the combination of auxiliary mechanism in advance of said needle and said looper with respect to the direction of rotation of said dial, including instrumentalities for forming loops of an auxiliary yarn through superposed margins of knitted fabric previously impaled on the points and engaging such loops about individual points, for incorporation in a seam chain subsequently formed by concatenated loops of the aforesaid usual needle and looper.

11. The invention according to claim 10, in which the instrumentalities embodied in the auxiliary mechanism comprise an auxiliary needle carrying the auxiliary yarn; means for repeatedly passing the auxiliary needle through the fabric margins during turning of the dial by a distance equal to the point spacing, a stitch finger over which loops of the auxiliary yarn are formed, and an element for holding the auxiliary yarn depressed during each retraction of the auxiliary needle so that said loops are engaged under the dial points.

12. The invention according to claim 11, wherein the auxiliary mechanism further comprises a depresser for intermittently depressing the stitch finger so that, at one actuation, the auxiliary needle overpasses the finger and, at the next actuation, said needle underpasses said finger.

13. The invention according to claim 10, wherein the looping machine has a drive shaft during each rotation of which a point on the dial is presented to the usual needle and usual looper, and further including interposed connections by which the auxiliary mechanism is actuated from said shaft.

14. In a looping machine having a rotary dial with points projecting radially from its periphery, a yarn-carrying needle and a cooperative looper to which the points are successively presented for the formation of a seaming chain of concatenated loops from such yarns, and a drive shaft during each rotation of which the dial is turned through a distance equal to the point spacing: the combination of auxiliary mechanism stationed in advance of said needle and said looper with respect to the direction of dial rotation, said mechanism comprising a fixed bracket arm overreaching the dial points, a vertical shaft supported by the bracket, connections by which said shaft is oscillated from the drive shaft of the machine, an arcuate auxiliary thread-carrying needle fixed in an arm on the vertical shaft and arranged to oscillate in a horizontal plane to form loops of the auxiliary yarn through doubled marginal edge portions of knitted fabric impaled upon the dial points in advance of the mechanism, a depresser for depressing the auxiliary yarn each time that the auxiliary needle is advanced so that, as said needle is retracted, loops of said yarn are engaged downwardly about the dial points, and connections whereby said depresser is actuated from the aforesaid vertical shaft.

15. The invention according to claim 14, wherein the means for actuating the depresser includes a slide rod to the bottom end of which the depresser is secured, a guide head on the bracket in which the rod is constrained to endwise movement, a lever medially fulcrumed on the bracket and having one extremity thereof operatively engaged with the upper end of the slide rod, and cam means at the upper end of the vertical shaft operative upon the opposite extremity of the lever to rock it and thereby cause the rod and the depresser affixed thereto to be reciprocated vertically.

16. The invention according to claim 14, wherein the auxiliary mechanism further includes a stitch finger stationarily supported at one end adjacent the edge of the point dial, with its distal end overreaching the dial points at the region of operation of the auxiliary needle, and actuating means for imparting vertical movements to the stitch finger so as to be alternately overpassed and underpassed by the auxiliary needle as the latter is successively thrust through the doubled fabric edge portions impaled upon the points as aforesaid.

17. The invention according to claim 16, wherein the stitch finger is in the form of a spring tongue, and wherein the means for actuating it comprises a ratchet wheel supported for rotation about a vertical axis and having radial teeth at the bottom thereof, a pawl operated from the vertical shaft for intermittently picking the ratchet wheel, and an upwardly spring pressed plunger constrained to endwise movement with its lower end bearing on the stitch finger and with its top end rounded to alternately engage on and between the radial teeth at the bottom of the ratchet wheel as said wheel is intermittently picked.

18. A method of seaming together superposed edge portions of knitted fabric, said method comprising the steps of impaling the fabric edge portions upon a series of points without strict regard as to serial penetration of individual loops of the fabric along any definite loop course; forming through the impaled fabric edges and about the points from an auxiliary yarn, loops in excess of the total course loops in the respective fabric portions, and finally forming, from a second and a third yarn, a seaming chain of concatenated loops for incorporation of the loops formed, as aforesaid from the auxiliary yarn, into a seam to unite the fabric edges.

19. Knitted fabric having a looped seam comprising loops of thread projected through loops of superposed edges of layers of the fabric, and sewed overseam stitches joining said edges binding the same, said sewed stitches comprising loops passing through said edges and through the first mentioned projected loops.

20. A looping machine comprising means for projecting loops of thread in one direction through loops of superposed layers of knitted fabric along a looping line and means for sewing said layers together, the last means passing stitch loops through said layers in the same direction as that of projection of the first mentioned loops and through the first mentioned projected loops.

21. A looping machine comprising means for projecting loops of thread through loops of superposed layers of knitted fabric along a looping line and means for sewing said layers together, the last means passing stitch loops through said layers and through the first mentioned projected loops, said first mentioned means projecting loops along a length of said looping line in excess of the number of said stitch loops along the same length and at least some of the stitch loops penetrating a plurality of the first mentioned projected loops.

22. A looping machine according to claim 21 in which at least some of the first mentioned projected loop are penetrated by a plurality of said stitch loops.

23. A looping machine comprising means for projecting loops of thread through loops of superposed layers of knitted fabric along a looping line and means for sewing said layers together, the last means passing stitch loops through said layers and through the first mentioned projected loops, said first mentioned means projecting through said layers a number of loops along a length of said looping line substantially in excess of the number of wales of one of said layers along the same length.

24. A looping machine according to claim 23 in which the first mentioned means projects loops along a length of said looping line in excess of the number of said stitch loops along the same length and in which at least some of the stitch loops penetrate a plurality of the first mentioned projected loops.

25. A looping machine according to claim 24 in which at least some of the first mentioned projected loops are penetrated by a plurality of stitch loops.

26. A looping machine according to claim 20 comprising means for controlling the lengths of the first mentioned projected loops.

27. A looping method comprising projecting loops of thread in one direction through loops of superposed layers of knitted fabric along a looping line, and sewing said layers together, the sewing comprising passing stitch loops through said layers in the same direction as that of projection of the first mentioned loops and through the first mentioned projected loops.

28. A looping method comprising projecting loops of thread through loops of superposed layers of knitted fabric along a looping line, and sewing said layers together, the sewing comprising passing stitch loops through said layers and through the first mentioned projected loops, the number of first mentioned loops projected along a length of said looping line being in excess of the number of fabric loops along the same length with at least some of the stitch loops penetrating a plurality of the first mentioned projected loops.

29. A looping method according to claim 28, in which at least some of the first mentioned projected loops are penetrated by a plurality of said stitch loops.

30. A looping method comprising projecting loops of thread through loops of superposed layers of knitted fabric along a looping line, and sewing said layers together, the sewing comprising passing stitch loops through said layers and through the first mentioned projected loops, the number of loops projected through said layers along a length of said looping line being substantially in excess of the number of wales of one of said layers along the same length.

31. A looping method comprising projecting loops of thread through loops of superposed layers of knitted fabric along a looping line, and sewing said layers together, the sewing comprising passing stitch loops through said layers and through the first mentioned projected loops, said stitch loops being loops of an overseam about free edges of said layers extending along the looping line.

32. Knitted fabric having a looped seam comprising loops of thread projected in one direction through loops of superposed edges of layers of the fabric, and sewed stitches joining said edges, said sewed stitches comprising loops passing through said edges in the same direction as that of projection of the first mentioned loops and through the first mentioned projected loops.

33. Knitted fabric having a looped seam comprising loops of thread projected through loops of superposed edges of layers of the fabric, and sewed stitches joining said edges, said sewed stitches comprising loops passing through said edges and through the first mentioned projected loops, the number of loops projected along a length of said edges being in excess of the number of fabric loops along the same length with at least some of the stitch loops penetrating a plurality of the first mentioned projected loops.

34. Knitted fabric according to claim 33 in which at least some of the first mentioned projected loops are penetrated by a plurality of said stitch loops.

35. Knitted frbric having a looped seam comprising loops of thread projected through loops of superposed edges of layers of the fabric, and sewed stitches joining said edges, said sewed stitches comprising loops passing through said edges and through the first mentioned projected loops, the number of loops projected through said edges along a length of said edges being substantially in excess of the number of wales of one of said edges along thet same length.

References Cited in the file of this patent

UNITED STATES PATENTS

| | | |
|---|---|---|
| 1,987,090 | Weinholz | Jan. 8, 1935 |
| 2,050,563 | DeSpain | Aug. 11, 1936 |
| 2,159,688 | DeSpain | May 23, 1939 |
| 2,264,234 | Bell | Nov. 25, 1941 |
| 2,518,552 | Kaplan | Aug. 15, 1950 |
| 2,787,899 | Getaz | Apr. 9, 1957 |

FOREIGN PATENTS

| | | |
|---|---|---|
| 357,588 | Great Britain | Sept. 25, 1931 |